United States Patent [19]

Steiner et al.

[11] Patent Number: 5,720,532
[45] Date of Patent: *Feb. 24, 1998

[54] PROCESS FOR ENDING AN AUTOMATIC BRAKING OPERATION

[75] Inventors: Manfred Steiner, Winnenden; Siegfried Rump, Weinstadt; Alexander Fuchs, Stuttgart, all of Germany

[73] Assignee: Mercedes-Benz AG, Germany

[*] Notice: The term of this patent shall not extend beyond the expiration date of Pat. No. 5,556,173.

[21] Appl. No.: 594,656

[22] Filed: Feb. 2, 1996

[30] Foreign Application Priority Data

Feb. 2, 1995 [DE] Germany ............... 195 03 202.0

[51] Int. Cl.⁶ .................................................. B60T 8/58
[52] U.S. Cl. .................. 303/125; 303/3; 303/113.4; 303/114.3
[58] Field of Search .................. 303/125, 113.4, 303/114.1, 114.3, 3, 15, 20, 10

[56] References Cited

U.S. PATENT DOCUMENTS

| | | | |
|---|---|---|---|
| 5,445,444 | 8/1995 | Rump et al. | 303/125 |
| 5,549,369 | 8/1996 | Rump et al. | 303/125 |
| 5,556,173 | 9/1996 | Steiner et al. | 300/113.4 X |

FOREIGN PATENT DOCUMENTS

| | | |
|---|---|---|
| 0 616 932 A1 | 9/1994 | European Pat. Off. . |
| 40 28 290 C1 | 1/1992 | Germany . |
| 42 08 496 C1 | 8/1993 | Germany . |
| 43 38 070 C1 | 2/1995 | Germany . |
| 2 283 548 | 5/1995 | United Kingdom . |
| 2 283 794 | 5/1995 | United Kingdom . |
| 2 289 729 | 11/1995 | United Kingdom . |

*Primary Examiner*—Lee W. Young
*Attorney, Agent, or Firm*—Evenson, McKeown, Edwards & Lenahan, P.L.L.C.

[57] ABSTRACT

A procedure is provided to end an automatic braking operation such that unwanted ending of the automatic braking operation is prevented. If a switching operation of the switching element takes place within a predetermined time interval after the triggering of the automatic braking operation, the automatic braking operation is not automatically ended. The system monitors whether another switching operation takes place within the time interval. The other switching operation is the reverse of the first switching operation. If another switching operation takes place during the time interval, a second relative motion between the push rod and the component which can be moved within a defined motional play has taken place in this time period. Since the brake pedal is continuing to be actuated, the automatic braking operation is not then ended.

5 Claims, 2 Drawing Sheets

PROCESS FOR ENDING AN AUTOMATIC BRAKING OPERATION

BACKGROUND AND SUMMARY OF THE INVENTION

The present invention relates to a method for ending an automatic braking operation.

DE-P 43 38 070, which is not prior art, describes detection of the relative motion between the push rod of the brake system and a component which can be moved relative to it within a defined motional play. Detection of the relative motion is accomplished by two momentary-contact switches (a make contact and a break contact) which are actuated by a common switching cam. If a switching operation corresponding to this relative motion takes place during an automatic braking operation, this braking operation is ended.

If the pressure difference, which is required for the automatic braking operation, between the chambers of the brake booster takes place too rapidly, an unforeseeable, unwanted switching operation of the switching element takes place. This leads to aborting of the switching operation in an early phase, in which the automatic braking operation had not yet achieved its effect. This takes place even when continuance of the automatic braking operation is in fact necessary.

An automatic braking operation is described, for example, in DE 40 28 290 C1. During the automatic braking operation, a higher brake pressure in generated than would correspond to the position of the brake pedal. The automatic braking operation is triggered when the driver actuates the brake pedal at a speed greater than a prescribed threshold value. The automatic braking operation is ended when release of the brake by the driver is inferred.

It is an object of the present invention to improve the process for ending the automatic braking operation such that unwanted ending of the automatic braking operation is prevented.

According to the present invention, this object has been achieved by providing that the automatic braking operation is carried out at least for the duration of a predetermined time interval, and fulfillment of the abort criterion within the predetermined time interval does not lead to the ending of the switching operation when another switching operation of the switching element takes place before expiration of the predetermined time interval.

If a switching operation of the switching element takes place within a predetermined time interval after the triggering of the automatic braking operation, the automatic braking operation is not automatically ended. On the contrary, the system monitors whether another switching operation takes place within the time interval. The other switching operation is the reverse of the first switching operation. If another switching operation takes place during the time interval, a second relative motion between the push rod and the component which can be moved within a defined motional play has taken place in this time period. This second relative motion corresponds to continued actuation of the brake pedal. The movement of the brake pedal in the direction of its rest position does not continue. Because the brake pedal is continuing to be actuated, the automatic braking operation should not be ended.

For this reason, the automatic braking operation is, according to the present invention, not ended if, after a switching operation which takes place within a defined time interval after the triggering of the automatic braking operation, another switching operation takes place within the defined time interval.

According to a refinement of the invention, the duration of the time interval is between 0 and 250 ms. The duration of the time interval should be chosen in such a way that, on the one hand, unwanted ending of the automatic braking operation is reliably precluded. On the other hand, the time interval chosen should not be so large that the driver notices "afterbraking", i.e. continuance of brake actuation after the release of the brake. The short duration of the interval makes this impossible. The duration of the time interval must be adapted to match the design parameters of the vehicle, in particular the variation of the braking force during the control of the brake booster.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figures 1, 1A:
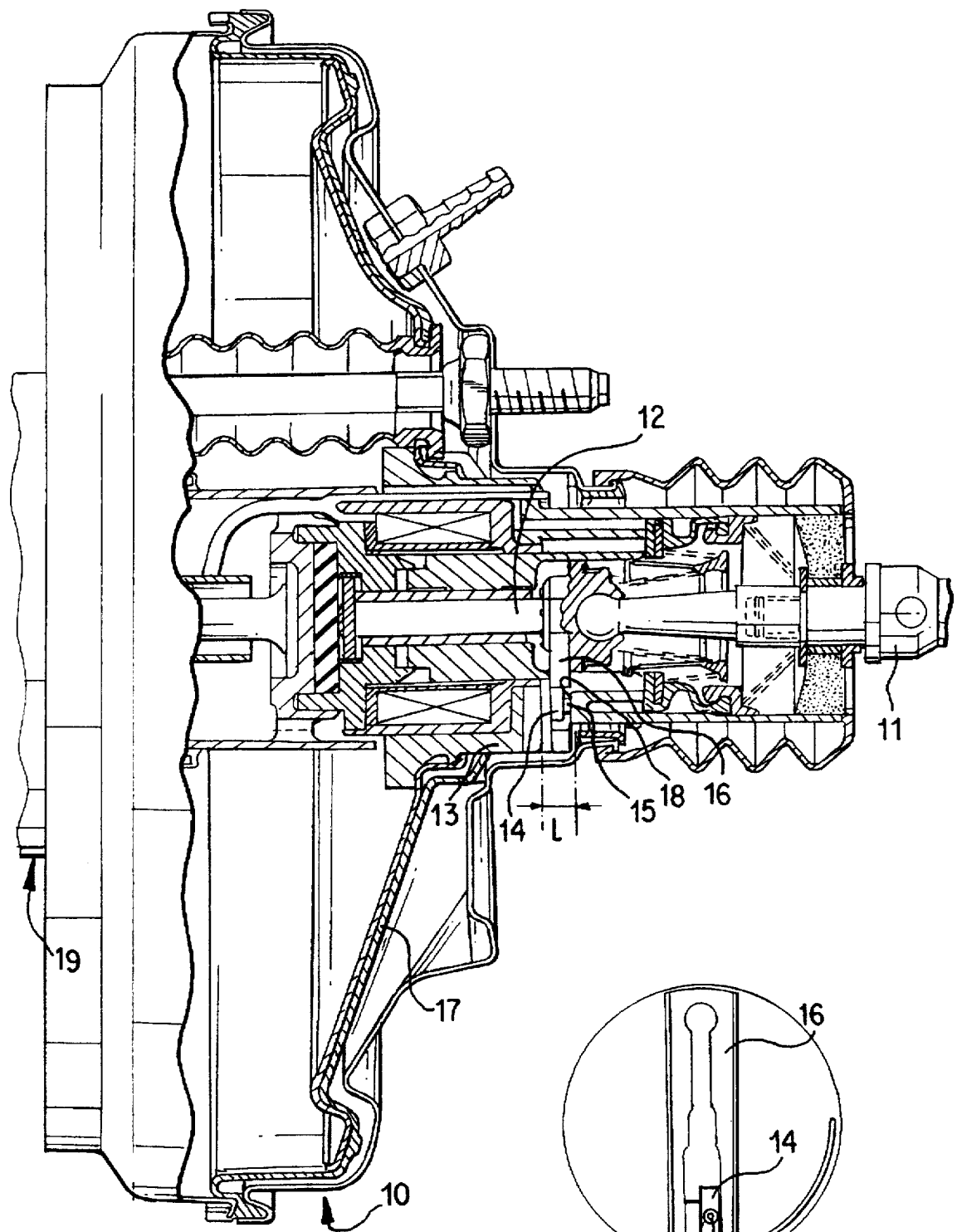
FIG. 1 is a cross-sectional through a brake booster, in a rest position, with a switching element arranged therein.

In FIG. 1, the brake booster designated generally by numeral 10 is in its rest position. The switching cam 15 of the switching element 14 arranged on the locking element 16 is likewise in the rest position. If a conventional brake pedal (not shown) is then actuated, the push rod 11 first moves only the valve piston 12 and, after the switching travel of the valve piston 12 in the control housing 13 has been traversed, moves both the valve piston 12 and the control housing 13 in the direction of the brake master cylinder 19.

When the brake pedal is released, the valve piston 12 moves backwards in the control housing 13 just before ending brake actuation, until the locking element 16 reaches the front stop 18. The switching cam 15 is then actuated by the front stop 18. If the switching element 14 is functioning normally, a switching operation takes place. The actuation of the switching element 14 ends a short time after ending the brake actuation when pressure equalization has taken place between the chambers of the brake booster in a known manner.

When an automatic braking operation is triggered, however, there is a pressure difference build-up between the chambers of the brake booster more rapidly than corresponds to the movement of the brake pedal and the push rod connected thereto. This likewise leads to a relative motion between the locking element 16 and the front stop 18 which moves together with the control housing 13 which is connected to the diaphragm 17 of the brake booster 10. The relative motion between the locking element 16 and the front stop 18 brings the switching cam 15 of the locking element 16 into contact with the switching element 14 with a resulting switching operation in the switching element 14. This switching operation takes place at a very early stage and is not taken into consideration in the explanation which follows, in particular in the number of switching operations to be counted. This actuation of the switching element 14 ends only when the actuation of the brake pedal ends.

If, however, the actuation of the brake pedal by the driver takes place very rapidly, contact between the switching cam 15 and the front stop 18 may be lost temporarily. A switching operation takes place and is referred to below as the first switching operation. This switching operation is, in fact, evaluated as the fulfillment of the abort criterion for the automatic braking operation. If, however, it takes place at the beginning of the automatic braking operation, this does not correspond to the driver's intention because the brake continues to be actuated. If the brake pedal continues to be actuated, contact between the switching cam 15 and the front stop 18 is rapidly reestablished. Another, second switching operation then takes place. If another switching operation takes place within the time interval, the automatic braking operation should not be ended. It is only if the first switching operation has corresponded because the actuation of the brake pedal by the driver has been ended that the second switching operation does not take place. Accordingly, the automatic braking operation must be ended on expiration of the time interval, which lasts for up to 250 ms.

Figure 2:
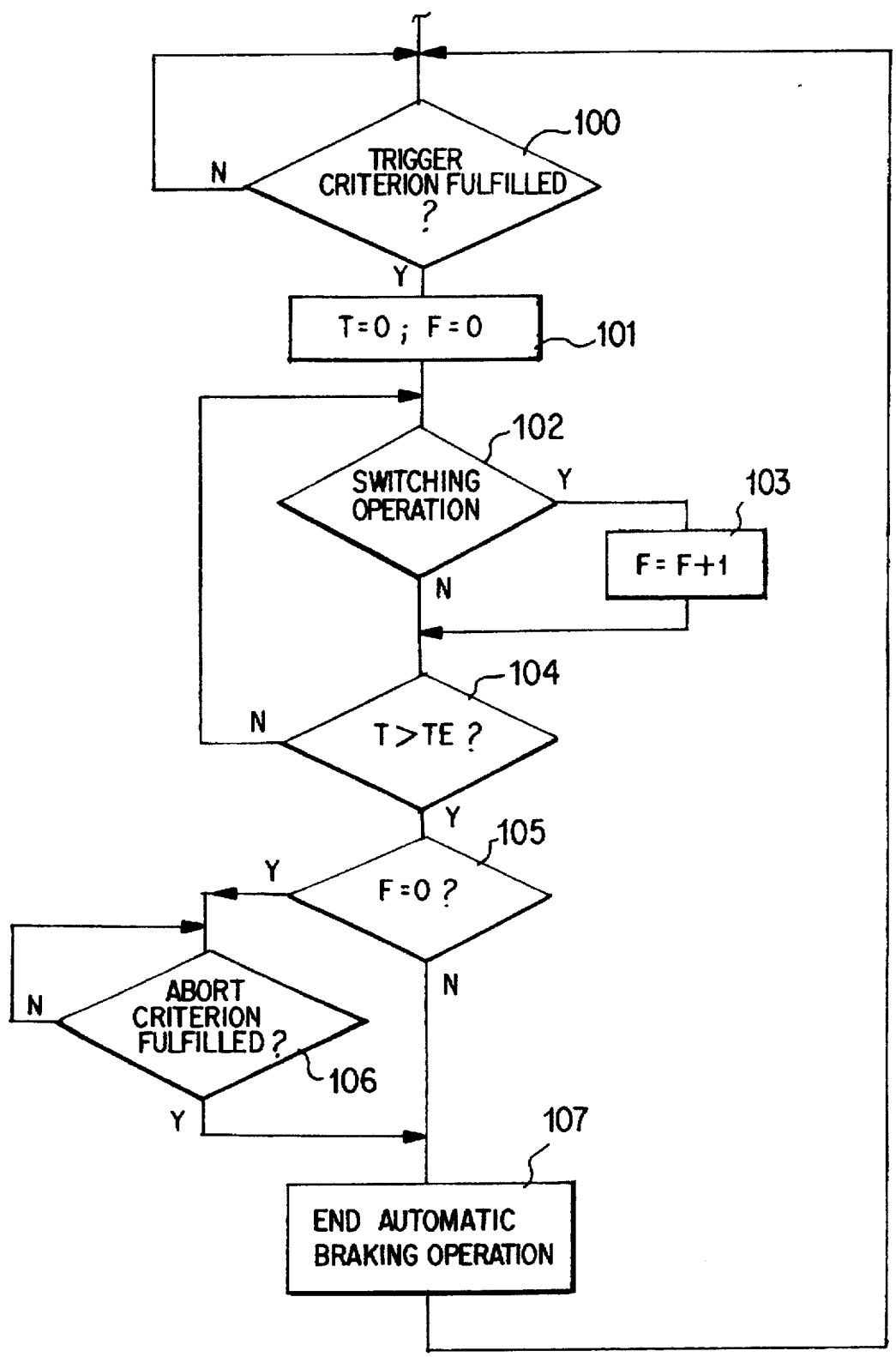
FIG. 2 is a flow diagram of a procedure according to the present invention.

FIG. 2 shows the flow diagram of a process for carrying out the present invention. The procedure illustrated relates only to the process of monitoring the ending of the automatic braking operation, not to the execution of the automatic braking operation per se. In step 100, the system monitors whether a trigger criterion for the automatic braking operation has been fulfilled. Until this fulfillment occurs, the system loops back to step 100. As soon as the trigger criterion has been fulfilled, the timer T is reset to zero in step 101. At the same time, the single-digit binary counter F, which is incremented with every switching operation of the switching element 14, is reset to zero.

In step 102, the system checks whether a switching operation has taken place. A switching operation is inferred if the switching state of the switching element 14 has changed since the last interrogation. As soon as switching operation is ascertained, the single-digit binary counter F is incremented in accordance with step 103. The counter F is designed so that its value changes with every counting operation. Thus it reassumes the value zero every second counting operation. Step 103 is followed by step 104, which also follows step 102 if, in step 102, the system ascertains that no switching operation has taken place. In step 104, the system then checks whether the timer has exceeded the duration TE of the time interval. Until this occurs, the system loops back to step 102.

As soon as the system has ascertained in step 104 that the timer has exceeded the duration TE, which is approximately 0 to 250 ms, it checks in step 105 whether the single-digit binary counter F has the value zero. This is the case either when no switching operation has taken place or when two switching operations have been detected. In this case, the system jumps to step 106. In step 106, the system checks whether an abort criterion for the automatic braking operation is fulfilled. This check is continued until an abort criterion has been fulfilled. Abort criteria are also disclosed in Ser. No. 08/337,425, filed Nov. 8, 1994; Ser. No. 08/337, 443, filed Nov. 8, 1994; Ser. No. 07/677,567, filed Mar. 29, 1991. The system then jumps to step 107.

If the system ascertains in step 105 that the single-digit binary counter F has the value 1, then either only one switching operation has taken place or three switching operations have taken place. In either case, the switching state of the switching element 14 corresponds to release of the brake pedal because the switching cam 15 of the locking element 16 is in contact with the front stop 18 of the control housing. The driver is thus ending the brake actuation and the automatic braking operation should likewise be ended. This takes place in step 107. As soon as the automatic braking operation has ended, the system loops back to step 100.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for ending an automatic braking operation in a motor vehicle having a brake system in which the pedal force generated at a brake pedal is transmitted to a brake booster via a push rod, a switching device is formed from an actuating element and a switching element, one of the two elements of the switching device is connected rigidly to the push rod, the other element of the switching device is arranged on a component which can be moved relative to the push rod only within the limits of a defined motional play, which component performs a relative motion within the limits of the motional play relative to the push rod, at least when there is a movement of the brake pedal in the direction of a rest position thereof, at least the relative motion is operative to cause a switching operation of the switching element, and the switching operation based on this relative motion is an abort criterion for the automatic braking operation, comprising the steps of triggering the automatic braking operation with a control unit as a function of brake pedal actuation, and ending the automatic braking operation when the abort criterion is fulfilled, wherein the automatic braking operation is carried out at least for the duration of a predetermined time interval, and fulfillment of the abort criterion within the predetermined time interval does not lead to the ending of the switching operation when another switching operation of the switching element takes place before expiration of the predetermined time interval.

2. The process according to claim 1, wherein the predetermined time interval is between 0 and about 250 ms.

3. The process according to claim 1, wherein the actuating element is a locking element configured to limit travel of a valve piston in a control housing.

4. The process according to claim 1, wherein the switching element is at least one momentary-contact switch arranged to be switched by the actuating element.

5. The process according to claim 1, wherein a single-digit binary counter is incremented with each switching operation of the switching element within the predetermined time interval.

* * * * *